United States Patent [19]

Howarth

[11] Patent Number: 5,261,096

[45] Date of Patent: Nov. 9, 1993

[54] INTERPROCESS MESSAGE PASSING METHOD IN A DISTRIBUTED DIGITAL DATA SYSTEM

[75] Inventor: David I. Howarth, Westford, Mass.

[73] Assignee: Bull HN Information Systems Inc., Billerica, Mass.

[21] Appl. No.: 662,855

[22] Filed: Mar. 1, 1991

[51] Int. Cl.⁵ .................. G06F 11/00; G06F 13/00
[52] U.S. Cl. .................. 395/650; 395/575; 364/DIG. 1; 364/284.4; 364/284.3; 364/281.3; 364/280.6
[58] Field of Search ............... 364/DIG. 1; 371/8.2, 371/11.2, 11.3; 395/200, 325, 575, 650

[56] References Cited

U.S. PATENT DOCUMENTS

| | | | |
|---|---|---|---|
| 4,500,960 | 2/1985 | Babecki et al. | 364/DIG. 1 |
| 4,630,196 | 12/1986 | Bednar, Jr. et al. | 364/DIG. 1 |
| 4,831,518 | 5/1989 | Yu et al. | 364/DIG. 1 |
| 4,879,716 | 11/1989 | McNally et al. | 364/DIG. 1 |
| 4,987,536 | 1/1991 | Humblet | 364/DIG. 1 |

Primary Examiner—Thomas M. Heckler
Attorney, Agent, or Firm—John S. Solakian

[57] ABSTRACT

In a distributed data system serving a large geographical area and having several network management systems, each for managing system components in a portion of the geographical area, the system including a number of workstations at which administrative commands for configuring or monitoring the network may be entered, each network management system and each workstation hosting a number of software processes, a method is provided of routing messages to processes as a function of the process name and the portion of the geographical area in which it has effect. This method facilitates reconfiguring network management systems to take over the functions of a failed network management system in a manner transparent to operators and administrators at workstations.

3 Claims, 2 Drawing Sheets

INTERPROCESS MESSAGE PASSING METHOD IN A DISTRIBUTED DIGITAL DATA SYSTEM

BACKGROUND OF THE INVENTION

1. Field of the Invention

The invention pertains to networks of distributed digital data systems, particularly to enhancing the reliability and functionality of network management functions by providing an interprocess message transmission method within such networks.

2. Description of the Prior Art

The invention is embodied in an EFTPOS (Electronic Funds Transfer/Point of Sale) system such as the one described in U.S. Pat. No. 4,879,716, "Resilient Data Communications System", issued Nov. 7, 1989 to McNally et al (hereinafter, "the McNally patent").

A large number of point-of-sale (POS) terminals are distributed over a very large geographical area, perhaps on the order of an entire continent. A communications network is provided which transports data over the entire geographical area, and all the POS terminals are connected to it, through telephone lines and intelligent line concentrators (called network access controllers, or "NACs"). Also connected to the communications network are computers operated by financial institutions.

The POS terminals are typically placed into service by merchants, who then accept transactions from consumers who carry plastic credit cards or debit cards which bear in machine-readable form an identification of a financial institution which maintains an account for the consumer, and an identification of that account. The primary function of the system is to forward from the POS terminals to the financial institution computers information identifying a consumer's account and a transaction the consumer wishes to make in that account, and to return from the financial institution to the POS terminal either an acceptance or rejection of that transaction.

A merchant wishing to place a POS terminal into service typically obtains the necessary equipment (the terminals and associated modems, etc.) from a "service provider" organization. Such an organization might have no role in the EFTPOS system beyond that of providing equipment, or larger merchants and financial institutions might function as service providers; in that case the latter role is kept separated from the former.

In addition to line concentrators for POS terminals and computers of financial institutions being connected to the communications network as described above, two other classes of equipment are connected to it which exist ancillarily to the system's aforementioned primary function: network management systems (NMSs), and management workstations (WSs). (WSs are not specifically discussed in the McNally patent, but are at the heart of SAFs 12 and are attached to NMSs 14 to provide an interface between operators and NMSs.)

NMSs are responsible for overall control and monitoring of the EFTPOS system; WSs are used by the network provider organization and service provider organizations to control and monitor particular equipment and communication paths for which they are responsible. As described in the McNally patent, the NACs can be dynamically reconfigured and can report their present status; operators and administrators at the WSs may enter commands to reconfigure the systems or commands requesting information on the current status of the systems. Commands originating at a WS are passed to an NMS for verification that the action or information requested is within the purview of the requesting organization, and are acted upon by the NMS following that verification.

The WSs and NMSs have software running in them to effect the entry of such commands and the responses to them. Each particular type of command typically invokes a particular path through the software, causing the execution of executable paths that are provided to perform particular functions required for a particular command. A software entity dedicated to a discrete function is known in the software arts as a "process".

WSs and NMSs are distributed throughout the geographical area served by the system. The NMS in a particular region of the geographical area generally exercises direct control and monitoring of the POS terminals and NACs in that particular region. A request pertaining to such a terminal or NAC and originating from a process in a WS or NMS in a different region must be forwarded over the communications network to a process in the NMS having cognizance of the target NAC, and a response must be forwarded back to the requesting process.

To enhance reliability of the EFTPOS system, provision exists to reconfigure NMSs, and the allocation of other system equipments to particular NMSs, in the event that one of the NMSs fails. The total number of NMSs is a function of total network size, within the constraints of system considerations: it would be operationally convenient to employ a small number of NMSs, each managing as many entities as possible, because this minimizes the number of inter-NMS transfers; but this represents a large unit of potential failure, and to guard against this a larger number of NMSs, each managing fewer entities, might be employed even though this is operationally inconvenient because it increases the number of inter-NMS message transfers required.

Should an NMS become non-functional, requests destined for it will not be honored until personnel can reconfigure to reallocate the processes it was performing. Such personnel would have to be cognizant of which NMSs were controlling which NACs, and might possibly have to maintain multiple concurrent connections to NMSs. Other operators of the system must then be informed of the new configuration, and must adjust their operating environments a accordingly. The time and effort required for such reconfiguration constitutes a significant degradation of system service.

SUMMARY OF THE INVENTION

The present invention overcomes this prior-art degradation of service by providing a method of routing messages among NMSs and WSs in which processes are addressed in terms of the function they perform and the geographic area they serve, and in which each NMS is provided with a routing table that allows these addresses to be converted to the names of real processes at specific NMSs. If an NMS fails other NMSs can be instructed to perform its functions and messages can be appropriately routed to the new processes by changing the NMS routing tables so that requests from WSs are routed to destination processes with minimum disruption of system service. It thus appears to operators that they are connected to a "utility"; i.e., they need not maintain cognizance of the configuration of NMSs or of the allocation of functions to them. Reconfiguration of the NMSs is transparent to such operators.

OBJECTS OF THE INVENTION

It is thus a general object of the invention to improve reliability of distributed data systems.

It is a particular object of the present invention to provide distributed data systems having multiple control nodes with improved methods of redistributing the functions of a failed control node.

This and other objects of the invention will be apparent to those skilled in the art after reviewing the following description of the preferred embodiment and the appended drawings, wherein:

DESCRIPTION OF THE PREFERRED EMBODIMENT

Figure 1:
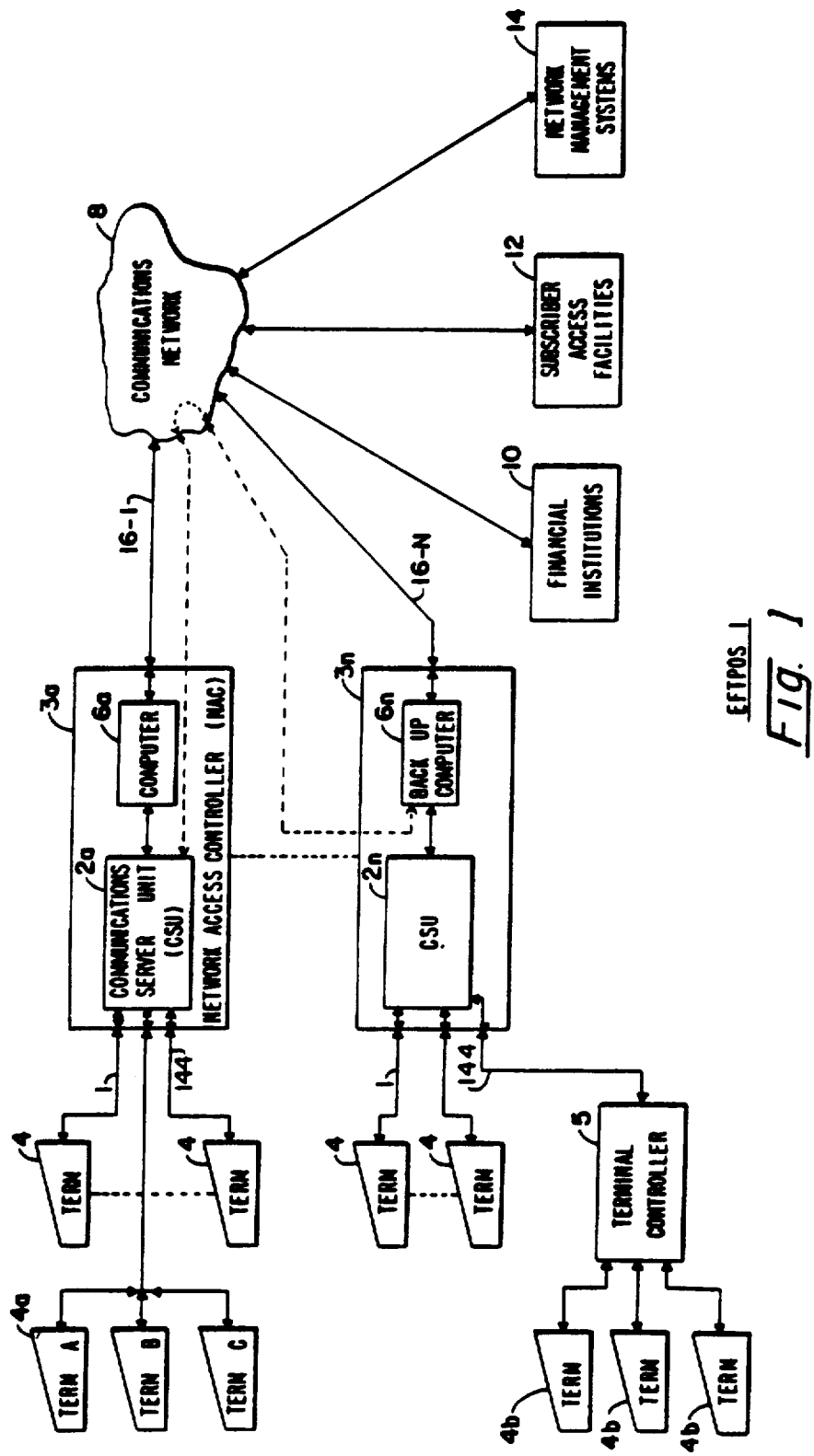
FIG. 1 provides an overview of the distributed data system in which the present invention is embodied.

FIG. 1, reproduced here from the McNally patent, provides an overview of the system in which the present invention is embodied, showing NACs 3, terminals 4, communications network 8, financial institutions 10, SAFs 12, NMSs 14, and communication lines 16. As noted above, workstations (WSs) are at the heart of SAF's 12; also, WSs are attached to NMSs 14.

Figure 2:
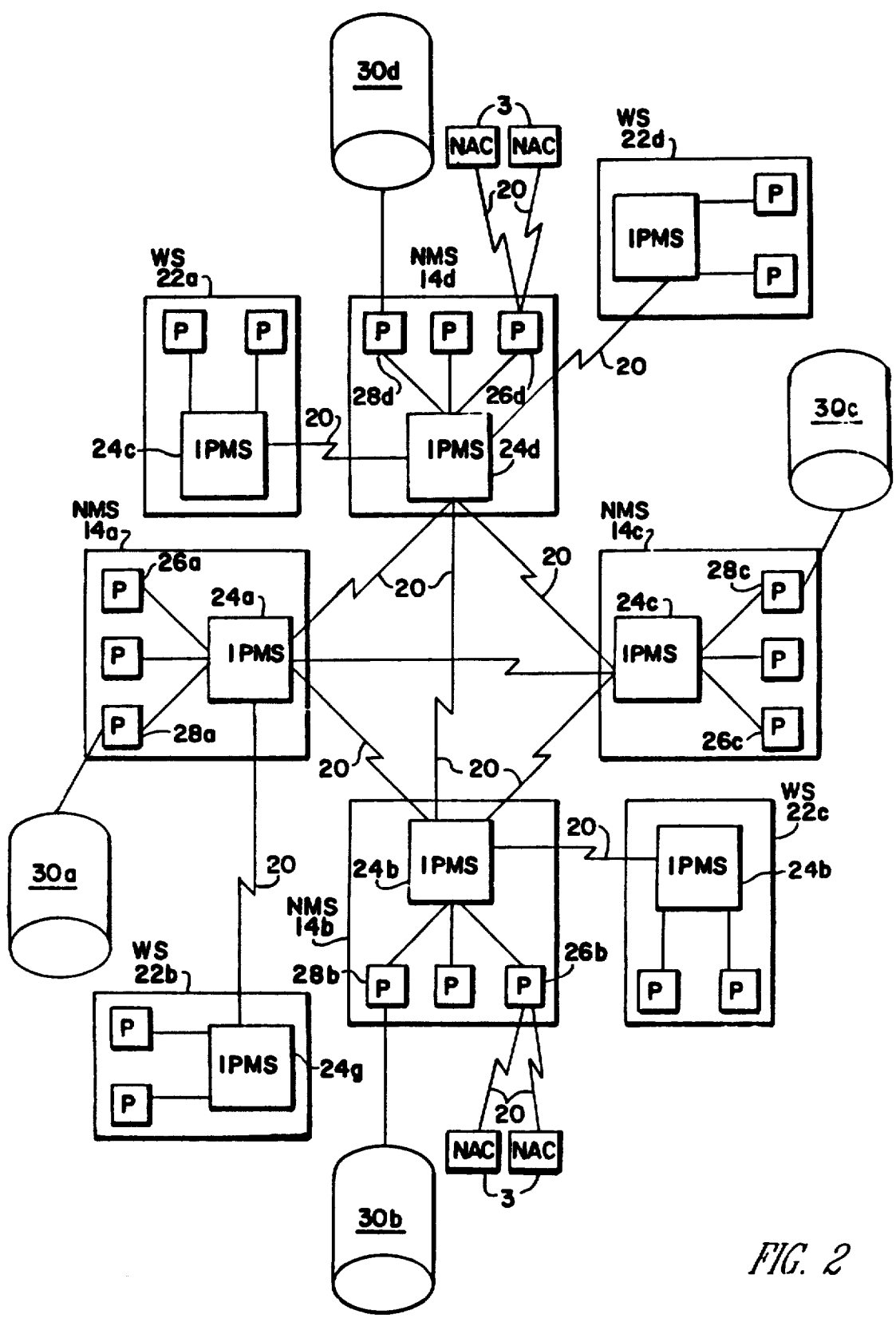
FIG. 2 provides further detail of that portion of the distributed data system embodying the present invention.

FIG. 2 provides greater detail in those portions of the system directly involved with the present invention. Four NMSs 14 are shown (the number four being chosen arbitrarily), denoted 14a through 14d. Four workstations (WSs) 22 (denoted 22a through 22d) are shown.

Each NMS and WS is depicted as hostinq a number of processes "P". These are software processes; i.e., as discussed above, software entities dedicated to particular functional tasks.

The units depicted in FIG. 2 are shown as being interconnected by communication links 20. These links are conceptual, and might be implemented through communications network 8, or they might be LANs, WANs, leased or switched telephone lines. Regardless of the nature of the link between a WS and an NMS, a WS is normally linked to only one NMS; should the WS originate a command that must ultimately be resolved by a different NMS, said different NMS will be accessed as a result of NMS-to-NMS communication, and not by virtue of establishing a link between the WS and said different NMS.

A number of NACs 3 are shown in FIG. 2. As has been discussed, the primary purpose of the system is to carry data pertaining to financial transactions bidirectionally from terminals 4 (not shown in FIG. 2) through NACs 3 to financial institutions 10 (also not shown in FIG. 2). FIG. 2 does not depict this role of the NACs 3, but rather depicts the paths by means of which NACs 3 are controlled and interrogated. Of the plurality of processes shown in NMSs 14, processes 26 (26a through 26d) are instances of a process called the Administrative Traffic Switch (ATS) process, the function of which is pass control messages to NACs and to receive status and alarm information from NACs.

Working closely with ATS processes 26 are Network Status Monitor (NSM) processes 28, having an instance in each NMS. NSM 28 maintains a running record of the status of all the NACs (and all the data paths to terminals 4 effectuated by those NACs) within the administrative purview of a particular NMS.

Other processes anywhere in the system may wish to interrogate an instance of NSM 28 to determine the status of a system component or path, or to have an instance of ATS 26 forward an administrative command to a NAC. As FIG. 2 shows, every WS and NMS has resident an instance of the Inter-Process Message Service (IPMS) 24. Processes, regardless of whether resident in the same WS or NMS, do not communicate with each other directly, but through the IPMS.

Two system rules are adopted to make implementation easier, and are not inherent or essential: It is a system rule that processes in different workstations may not communicate with each other. It is also a system rule that any interprocess communication, only one NMS-to-NMS transmission is permitted. (In order to facilitate this, each NMS has a link 20 to every other NMS. This simplifies the detection of messages routed in a loop, and it minimizes transmission overhead. Neither is essential to the scheme as well-known algorithms exist for loop detection and transmission overheads are commonly traded against costs.)

Each NMS and WS is assigned a unique name. By way of example, if the geographical area to be covered were the continental U.S., the NMSs 14 might be located and named thusly:

One in the northwest, which might be named "NW-NMS";

One in the southwest, which might be named "SW-NMS";

One in the northeast, which might be named "NE-NMS"; and

One in the southeast, which might be named "SE-NMS".

Each NMS would typically manage NAC's in its geographical region, and respond to workstations in its geographical region. But, by configuring the NMSs and communications links appropriately, an NMS could, if need be, manage any NACs and respond to any workstations regardless of location.

Each instance of a process has a name consisting of three ASCII characters. The name must be unique within the NMS or WS on which the process resides. For example, each instance of the aforementioned Administrative Traffic Switch process might be assigned the process name "ATS". The name is reported to the local instance of IPMS when the process initiates, and is checked for uniqueness. When it is found to be unique, the name is entered in the routing table of the local IPMS. For example, when the instance of process ATS is initiated in NW-NMS an entry is made in NW-NMS's routing table that allows messages to be routed to the process ATS at NW-NMS. Any NMS may now successfully send messages to this instance of ATS by adding the following information to its IPMS routing tables:

| ADDRESS | TARGET PROCESS | TARGET SYSTEM |
|---------|----------------|---------------|
| NW-ATS  | ATS            | NW-NMS        |

Similarly, instances of ATS whose functions are to pass administrative traffic to NACs in their respective regions would be initiated in the NMSs in those respective regions; corresponding entries are made in the routing tables at each NMS; and the entries made at each NMS can be propagated to all the NMSs. At this point, the routing table at each NMS contains the following entries:

| ADDRESS | TARGET PROCESS | TARGET SYSTEM |
|---|---|---|
| NW-ATS | ATS | NW-NMS |
| SW-ATS | ATS | SW-NMS |
| NE-ATS | ATS | NE-NMS |
| SE-ATS | ATS | SE-NMS |

Routing tables are also maintained in each WS. However, those routing tables are simpler in that the routing table in a particular WS only contain the names of processes resident in that WS; i.e., entries are not promulgated from a WS to any other WS nor to NMSs. The instance of IPMS in a WS assumes that any process addresses it does not find in its routing table can be resolved by the NMS to which the WS is connected. (As discussed previously, it is a system rule that a process in a WS may address messages to another process in the same WS or to a process in any NMS, but may not address messages to a process in another WS.)

It will now be assumed that an operator at a WS located in the southeast and connected to SE-NMS wishes to send an administrative message to a NAC located in the northwest. He would cause the WS to address the message to NW-ATS. The instance of IPMS local to his WS would not be able to resolve that address, as discussed above, and would thus assume that SE-NMS can resolve it. The WS would therefore forward the message via a communication link 20 to SE-NMS. SE-NMS, from its routing table as described above, determines that the message must be routed to process ATS on NW-NMS. There being sessions established over communications links 20 among all NMS's, SE-NMS forwards the message over the appropriate communications link 20 to NW-NMS, which delivers the message to its local instance of process ATS for action.

It will now be assumed that NW-NMS fails, and becomes defunct. Operators at other NMSs detect this, and enter commands to reconfigure accordingly. For example, it might be decided that SW-NMS will take over NW-NMS's functions (while continuing to perform the functions it was already performing). The instances of pertinent processes (including ATS) in SW-NMS are reconfigured to service the northwest, and the appropriate ones of communications links 20 are reconfigured accordingly. SW-NMS alters the entries in its routing table to reflect the new configuration, and promulgates the new routing table to all remaining NMSs. Thus, regarding process ATS, the entries in the routing tables appear thusly:

| ADDRESS | TARGET PROCESS | TARGET SYSTEM |
|---|---|---|
| NW-ATS | ATS | SW-NMS |
| SW-ATS | ATS | SW-NMS |
| NE-ATS | ATS | NE-NMS |
| SE-ATS | ATS | SE-NMS |

Supposing that the aforementioned hypothetical operator now wishes to send another administrative message to a NAC in the northwest, he proceeds exactly as before, and his WS proceeds exactly as before, sending a message addressed to process NW-ATS to SE-NMS. SE-NMS, now conditioned by the changed routing table, forwards the message to SW-NMS which, as discussed above, has been reconfigured to service the NACs in the northwest. Thus, the network topology appears unchanged to the operators when in fact it has changed significantly.

Those skilled in the art will perceive applications of the invention in embodiments other than the one described here. The a invention is intended to be embraced by the appended claims and not limited by the foregoing embodiment.

I claim:

1. In a distributed digital data system including
 a communication network;
 a plurality of data terminals geographically distributed throughout the area served by said system and operatively connected to the communication network;
 a plurality of control computers geographically distributed throughout the area served by said system and operatively connected to the communication network;
 a plurality of software processes running in each control computer for monitoring the system or controlling parameters of the system;
 a method of passing messages among the processes comprising the steps of:
 providing a routing table in each control computer specifying the addresses of processes in terms of an identification of the control computer at which a process resides;
 propagating said routing table address of each process to all the routing tables;
 forwarding a message originated by any process to another process at the address specified in the routing table in the control computer where an originating process resides; and
 in the event that a system monitoring process running in a first of said control computers detects that a second of said control computers has become inoperative;
 in the routing table of one of said remaining operative control computers, altering the addresses of processes resident in said second control computer to identify said one remaining operative control computer, and
 propagating said altered routing table addresses to the other routing tables.

2. In a distributed digital data system including
 a communication network;
 a plurality of data terminals geographically distributed throughout the area served by said system and operatively connected to the communication network;
 a plurality of control computers geographically distributed throughout the area served by said system and operatively connected to the communication network;
 a plurality of software processes running in each control computer for monitoring the system or controlling parameters of the system;
 a plurality of workstations coupled to each control computer,
 a plurality of software processes running in each workstation for monitoring the system or controlling parameters of the system;
 a method of passing messages among the processes comprising the steps of:

providing a routing table in each control computer and each workstation specifying the addresses of processes in terms of an identification of the control computer at which a process resides;

propagating said routing table address of each process to all the routing tables;

forwarding a message originated by any process to another process at the address specified in the routing table in the control computer or workstation where an originating process resides; and in the event that a system monitoring process running in a first of said control computers detects that a workstation coupled thereto or that a second of said control computers has become inoperative;

in the routing table of one of said remaining operative workstations or control computers, altering the addresses of processes resident in said inoperative workstation or second control computer to identify said one remaining operative workstation or control computer, and propagating said altered routing table addresses to the other routing tables.

3. In a distributed digital data system including a communication network;

a plurality of data terminals geographically distributed throughout the area served by said system and operatively connected to the communication network;

a plurality of control computers geographically distributed throughout the area served by said system and operatively connected to the communication network;

a plurality of software processes running in each control computer for monitoring the system or controlling parameters of the system;

a method of passing messages among the processes comprising the steps of:

providing a distributed interprocess message service (IPMS) program in each of said control computers, each IPMS program including a routing table specifying the addresses of processes in terms of an identification of the control computer at which a process resides;

propagating said routing table address of each process to be routing table of all IPMS programs;

forwarding a message originated by any process to another process at the address specified in the routing table in the control computer where an originating process resides; and in the event that a system monitoring process running in a first of said control computers detects that a second of said control computers has become inoperative;

in the routing table of one of said remaining operative control computers, altering the addresses of processes resident in said second control computer to identify said one remaining operative control computer, and propagating said altered routing table addresses to the other routing tables.

* * * * *